United States Patent [19]
Ballard et al.

[11] 3,884,857
[45] May 20, 1975

[54] LOW GEL CONTENT ETHYLENE COPOLYMER/WAX BLENDS AND PROCESS FOR PREPARATION THEREOF

[75] Inventors: Edward Cooper Ballard; John Ricks Priest, both of Wilmington, Del.

[73] Assignee: E. I. du Pont de Nemours and Company, Wilmington, Del.

[22] Filed: Apr. 9, 1973

[21] Appl. No.: 349,484

Related U.S. Application Data

[63] Continuation-in-part of Ser. No. 143,311, May 14, 1971, abandoned.

[52] U.S. Cl. .................. 260/28.5 AV, 260/33.6 UA;
  260/86.7; 260/87.3
[51] Int. Cl. ............................................ C08f 45/52
[58] Field of Search ........................... 260/28.5 AV

[56] References Cited
UNITED STATES PATENTS

| | | | |
|---|---|---|---|
| 3,030,322 | 4/1962 | Schrader | 260/28.5 A |
| 3,048,553 | 8/1962 | Moss | 260/28.5 AV |
| 3,215,657 | 11/1965 | Beresniewicz | 260/28.5 AV |
| 3,422,551 | 1/1969 | Blank | 260/28.5 AV |

*Primary Examiner*—Joseph L. Schofer
*Assistant Examiner*—Paul R. Michl

[57] ABSTRACT

Continous process for the production of low gel content ethylene copolymers comprising the in-line addition of molten wax (with or without free radical initiator) into the polymer stream under turbulent conditions after most but not all of the unreacted monomers have been removed. The low gel content ethylene copolymer/wax blends prepared by the above process are particularly useful in coating compositions for paper, paperboard or corrugated board.

25 Claims, 1 Drawing Figure

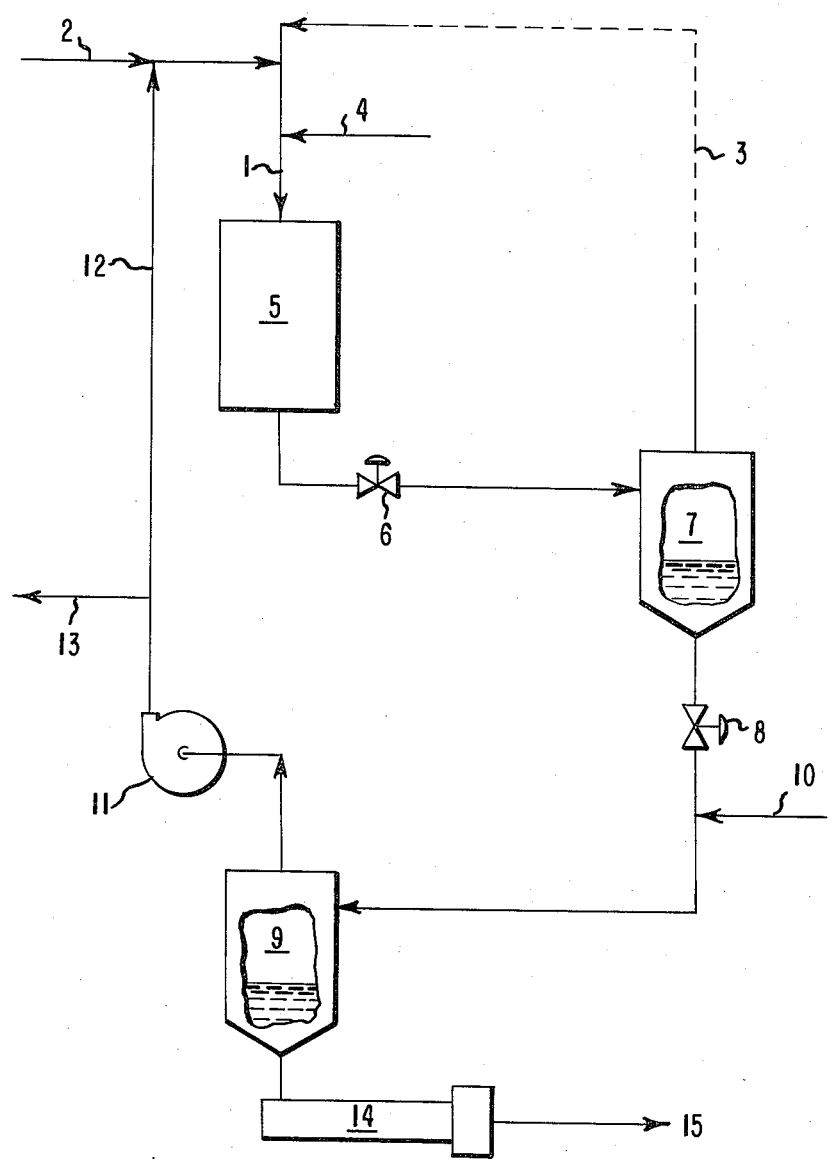

LOW GEL CONTENT ETHYLENE COPOLYMER/WAX BLENDS AND PROCESS FOR PREPARATION THEREOF

CROSS-REFERENCE TO RELATED APPLICATION

This application in a continuation-in-part of our co-pending application serial No. 143,311, filed May 14, 1971 now abandoned.

BACKGROUND OF THE INVENTION

1. Field of The Invention

This invention relates to ethylene copolymers and more particularly, it relates to the manufacture of low gel content ethylene copolymer/wax blends.

2. Description of the Prior Art

Gel (insoluble polymer particles) has long been recognized as an undesirable contaminant in ethylene copolymers produced in free radical-initiated high pressure polymerizations. In appearance it varies from small particles, called "micro" gel or "background" gel to relatively large particles called "fisheye" or "lens" gel.

Gel is undesirably overpolymerized (very high molecular weight), or crosslinked, polymer not soluble in the bulk of the product at the temperatures which are normally encountered in processing and using the polymer. Gel detracts from the appearance of films prepared from essentially 100 percent polymer systems. It also affects adversely the appearance and ease of application of hot melt formulations based on ethylene copolymers when these formulations are used to coat packaging substrates such as paper, paperboard, and corrugated board. Gel present in the polymer also appears to serve as the nucleus for the development of larger gel particles when ethylene copolymer-based formulations are held molten during blend preparation and application.

A number of solutions have been suggested to at least partially overcome these disadvantages. Polymer can be treated in high shear mixers to break down the gel. Polymer can be forced through fine mesh screens to filter out gel and/or break the gel into smaller particles so that it becomes less harmful. It is stated in U.S. Pat. No. 3,157,628 that, in a high-pressure tubular reactor, a small amount (0.05 to 0.20 percent based on the weight of the polyethylene produced) of an A-stage paratertiaryalkylphenol-formaldehyde resin can be injected into the last half of the elongated reaction zone to decrease the number of fisheyes and lenses present in films made from the polymer. The above patent further states that many products, such as di-tertiarybutyl-para-cresol (BHT), which are known to be free radical traps at lower temperatures, are not effective under the conditions covered by the patent.

Moss U.S. Pat. No. 3,048,553 is directed to an improved process for blending wax and ethylene/vinyl acetate copolymers to avoid long agitation times or use of costly, high shear equipment. This patent is primarily concerned with batch processes; the only example is of such a batch process. Improved blending is accomplished by Moss by adding molten wax to the substantially anhydrous reaction mixture obtained in the elevated temperature, high pressure bulk polymerization of ethylene and vinyl acetate. Moss contemplates adding the wax to the batch reactor at polymerization pressure or after partial pressure let down, but in any event he teaches that the pressure should not be reduced below 250 atmospheres before wax addition. As Moss states, his reaction mixture contains the ethylene/vinyl acetate copolymer and unreacted ethylene and vinyl acetate monomers. Under these conditions no separation of unreacted monomers from the ethylene/vinyl acetate copolymer takes place. Of course, the copolymerization of ethylene/vinyl acetate may be carried out batchwise or continuously and Moss referred to this fact in his description. However, the only teaching of how to carry out his invention in a continuous process was that the wax should be added at a point effectively removed from the polymerization zone so that there would be no backmixing of the wax into the ingredients undergoing polymerization. Thus, just as in the batch process, there is no suggestion to remove any of the unreacted monomers from the reaction mixture prior to addition of the wax. The Moss patent does not address itself to solving the problem of high gel content in ethylene copolymer/wax blends, nor does he describe or suggest a continuous process which would bring about this result.

SUMMARY OF THE INVENTION

According to the present invention there is provided in a continuous, high-pressure, free radical polymerization process for preparing ethylene copolymers having reduced gel content comprising (a) introducing ethylene and at least one monomer selected from the group consisting of vinyl esters of $C_1$ to $C_4$ monobasic aliphatic acids, acrylates and methacrylates wherein the alcohol moiety is derived from aliphatic $C_1$ to $C_4$ monohydroxy alcohols, acrylic acid, methacrylic acid, maleic acid, and maleic anhydride, provided that at least 85 mol percent of the monomers is ethylene and sufficient amount of said vinyl ester, acrylate or methacrylate monomer is introduced to yield at least about 5 weight percent of units derived from said monomer in the resulting copolymer, and an initiator into the reactor, (b) maintaining the monomers and initiator in contact in the reactor at a temperature of about 100°C.–250°C. and a pressure of about 1,000–2,500 atmospheres until the desired extent of conversion to ethylene polymers has been obtained, (c) removing the reaction mixture from the reactor, (d) reducing the pressure by first pressure letdown means such that the reaction mixture enters a first separator at about 100–400 atmospheres, (e) separating out from the reaction mixture in a first separator about 90–97 percent of the unreacted monomers, (f) further reducing the pressure by second pressure letdown means such that the reaction mixture enters a second separator at about 0–5 atmospheres, and (g) separating out from the reaction mixture in a second separator substantially all of the remaining 3–10 percent by weight of unreacted monomers, the improvement in this process comprising the in-line addition of about 5–50 percent by weight, based on the total weight of the copolymer and wax, of a molten petroleum, polyethylene or Fischer-Tropsch wax to said ethylene copolymer reaction mixture after the pressure has been reduced to below about 250 atmospheres and after at least about 90 percent by weight, but not more than about 97 percent by weight, of the unreacted monomers have been separated out from the reaction mixture.

According to the present invention there is provided a further improvement in the above process comprising the in-line addition of a free radical initiator along with the molten wax to the ethylene copolymer reaction mixture thereby reducing the melt index of the copolymer by at least about 50 percent.

In the context of the present invention the phrase "reduced gel content" means that polymer made by the improved processes of this invention has at most about one-half the number of gel particles found in control polymers of the same melt index made by direct synthesis without wax addition and/or without free radical initiator treatment.

BRIEF DESCRIPTION OF THE DRAWING

The FIGURE is a schematic illustration of the process of the present invention.

DESCRIPTION OF THE PREFERRED EMBODIMENTS

Surprisingly, it has been found that the in-line injection of molten wax into the product stream during the production of ethylene polymers gives products which are significantly lower in gel content than are the corresponding base polymers (i.e., when conversion to copolymer is carried out to the same extent without wax addition). In addition, such polymer/wax blends exhibit lessened blocking tendency when stored or shipped in bulk containers, and dissolve in molten wax more rapidly than the base polymers.

The ethylene polymers employed in the present invention are copolymers of ethylene with one or more copolymerizable monomer. They are those used in wax-based formulations as barrier coatings, heat seal coatings and adhesives. They are all produced under similar conditions and all have recognizable and, for use in many applications, undesirable gel content. Many ethylene-based copolymers containing vinyl esters or methacrylates or acrylates, both with and without additional comonomers such as acrylic, methacrylic or maleic acid or maleic anhydride, have been tested as flexibilizing polymers for wax systems and several of them are in large scale commercial use. Thus suitable ethylene copolymers are those containing at least about 5 percent by weight of vinyl esters of $C_1$ to $C_4$ monobasic aliphatic acids and acrylates and methacrylates wherein the alcohol moiety is derived from aliphatic $C_1$ to $C_4$ monohydroxy alcohols. Copolymers of this type can also be produced containing acidic groups (e.g., about 0.01–10 percent by weight) such as the ones derived from acrylic acid, methacrylic acid, maleic acid or maleic anhydride. These are described in U.S. Pat. No. 3,215,678 and U.S. Pat. No. 3,215,657.

The gel reducing effect of the present invention increases as the comonomer (e.g., vinyl acetate) content increases. At higher wax concentrations and lower melt indexes as little as about 5 weight percent vinyl acetate (or acrylate, etc.) containing copolymer will show a substantial reduction in gel level. Gel content can be reduced to particularly low levels in over about 15 percent vinyl acetate-containing copolymers.

The melt index of the polymer employed is not critical. The lower limit is established by ease of processability during manufacture, i.e., the characteristics of the polymer to readily flow through the equipment. At a high melt index about 1,000 or so, the gel content of the polymers prepared without in-line wax addition are not as high as at lower melt indices. The most serious gel problem is posed with lower melt index polymers and accordingly, the process of the present invention can be used to best advantage with polymers of about 0.1 to 100 melt index.

Waxes suitable for use in the present invention are those which are recovered, or isolated, from crude petroleum and which melt in the range of 110°F.–200°F. They include those normally referred to as "paraffin wax," "intermediate wax," and "microcrystalline wax." Well refined waxes which are white or only light yellow in color are to be preferred over less purified petroleum waxes which can be dark brown in color. Also suitable but less preferred for economic and compatibility reasons are the polyethylene and Fischer-Tropsch waxes. Most preferred waxes are refined paraffin waxes having AMP melting points between about 130°F.–160°F. and refined intermediate or microcrystalline waxes having ASTM D-127 melting points of about 140°F.–200°F.

The description to follow will be in the context of the manufacture of ethylene copolymers, especially ethylene/vinyl acetate copolymers.

A typical high-pressure, stirred reactor, free radical-initiated, continuous polymerization process in which the benefits of the present invention can be realized is illustrated in the FIGURE. Feed stream 1 consists essentially of about 5–20 weight percent (preferably about 10–15 weight percent) of fresh monomer makeup stream 2, about 80–95 weight percent of recycled unreacted monomer stream 3 and initiator stream 4. Monomer makeup stream 2 is a mixture of ethylene with one or more copolymerizable monomers (such as vinyl acetate) and accordingly, unreacted monomer stream 3 will contain ethylene and unreacted comonomer. Initiator stream 4, comprising a solution of a conventional reaction initiator (such as dialkyl peroxydicarbonates, t-butyl peracetate, t-butyl peroxypivalate) suitable for the temperature at which the polymerization is suitable for the temperature at which the polymerization is being run, is injected into the feed stream at the entrance to reactor 5. Feed stream 1 enters reactor 5 at a temperature substantially lower (usually 100°C. or more below reaction temperature) than that at which the polymerization is run. Usual feed temperatures are in the range of about 0°C.–60°C. The feed stream is introduced into the reactor at about 1,000–2,500 atmospheres, preferably about 1,300–2,000 atmospheres, pressure.

Conversion of 5 to 15 wt. percent of the monomers in the feed stream takes place in the reactor. The heat liberated in the polymerization raises the temperature of the feed stream to the desired reaction temperature, generally about 100°C.–250°C., preferably 120°C.–210°C. The reaction mixture, consisting essentially of a single phase with the polymer dissolved in unreacted ethylene and comonomers, passes through a let-down valve 6 wherein the pressure is reduced such that the reaction mixture enters first separator 7 at about 100–400 atmospheres, preferably about 150–200 atmospheres where the single phase which was present at reactor pressures separates into a major gaseous phase of unreacted ethylene and comonomers, and a second, impure molten polymer phase consisting primarily of polymer but containing some dissolved monomeric ethylene and comonomers. This impure molten polymer discharges from the bottom of first separator 7, passes through a second let-down valve 8 wherein the pressure is reduced (to between about 10 and 50 atmospheres) such that the reaction mixture enters second separator 9 at a gage pressure (above ambient) of about 0–5 atmospheres, preferably about 1–3 atmospheres. While it is flowing through the line between second let-down valve 8 and second separator 9, it is in a very turbulent condition because it is passing through a relatively small pipe, and the monomeric ethylene and comonomers which were dissolved in the product under the conditions prevailing in first separator 7 are flashing into a gaseous phase.

Under these conditions of turbulent flow and good mixing a suitable petroleum wax, in molten form at about 80°C.–120°C., is metered and injected into the polymer stream through line 10 in quantity to give the desired polymer/wax ratio in the final product. This can be achieved by a positive displacement pump capable of output pressures exceeding those in the line and which can be heated and maintained at the temperature of the molten wax. In many applications only 5 to 20 weight percent wax is desired in the concentrate. Uniform concentrates with wax levels in this range are easy to achieve with only one in-line addition port for the wax between second letdown valve 8 and second separator 9. In some cases it may be desirable to inject the wax at two or more locations. It is possible to add sufficient wax to produce even a 50/50 polymer/wax product. In some cases to achieve good mixing of the thin wax and the viscous polymer melt when putting large amounts of wax into the blend, it may be desirable to use a baffled mixing zone in the pipe between second letdown valve 8 and second separator 9. It is preferred to introduce the molten wax between second letdown valve 8 and second separator 9 because this is the earliest time in the process at which wax can contact the crude polymer stream and influence gel formation or gel dispersion without the danger of significant quantities of volatilized wax getting back into recycle stream 3 and, through its telogenic activity, undesirably decreasing polymer molecular weight, and because of the excellent mixing conditions encountered in this area of turbulent gas-liquid flow caused by vaporization of residual monomeric ethylene. Wax can also be introduced between first separator 7 and second let-down valve 8, or into second separator 9. In this latter case it would be necessary to design some mixing system into second separator 9 by which the low viscosity molten wax could be rapidly dissolved and uniformly blended into the high viscosity molten polymer.

Approximately 90–97 wt. percent, preferably at least 95 wt. percent, of the unreacted ethylene and comonomers separate from the polymer phase in first separator 7 and are recycled without coming in direct contact with the petroleum wax being added to the system. Substantially all of the remaining about 3–10 wt. percent of unreacted monomers are removed from the crude polymer stream in second separator 9. Thus, the wax mixing with the crude polymer stream only contacts about 3–10 wt. percent, preferably 3–5 wt. percent, of the unreacted monomers. Furthermore, these monomers are at low pressure and thus do not carry a significant amount of the petroleum wax (in vapor form) back into reactor 5. A portion of these unreacted monomers, after their pressure has been increased in compressor 11 to about 20–50 atmospheres, can be recycled to reactor 5 after further compression, as minor recycle stream 12, whereas the rest leaves the system as purge gas stream 13. This avoidance of major contact between the recycle monomers and the wax is an important part of the present process and is necessary for the production of uniform polymer/wax concentrates.

After the unreacted monomers have been removed to the desired extent in second separator 9 the molten polymer flows into melt cutter 14 where the polymer is extruded through suitable dies and is cut under water into approximately 150 inch diameter spheroids. The solidified polymer pellets are air transported to blending bins and, after blending and purging of residual monomers, are packaged.

It has also been found that the present invention offers a method to produce low melt index (MI) polymers with a lower gel content than is possible to attain by direct synthesis. As mentioned above, this aspect of the present invention applies whenever the melt index of the copolymer is reduced by at least about 50 percent by the in-line addition of a free radical initiator to the ethylene copolymer mixture. Preferably, the melt index of the resulting copolymer is about 0.01 to 50. In the most preferred embodiments the resulting copolymer will have a melt index of about 0.05 to 5. The melt index reduction is accomplished by using the general procedure described above but modified to the extent that a low concentration of a suitable organic peroxide or azonitrile, i.e., free radical initiator, which can serve as a source of free radicals, is continuously injected into the wax stream before the wax stream is injected into the ethylene copolymer flowing through the line between the first and second separator. The injection of the wax/free radical initiator solution into the polymer reaction occurs after the pressure has been reduced to below about 250 atmospheres and after at least about 90 percent by weight, but not more than about 97 percent by weight of the unreacted monomers have been separated out of the reaction mixture. The free radical initiator is selected such that its half life at the temperature within the second separator is approximately 60 seconds.

During the normal 10–20 minute hold-up time in the second separator the source of free radical is essentially all decomposed. The free radicals generated by its decomposition promote crosslinking of the polymer in the reaction mixture, the extent of the crosslinking being controlled by the concentration of the free radical initiator injected into the wax. Using this process the melt index of the ethylene copolymer can be reduced by at least about 50 percent beyond the value that would be obtained by direct synthesis only. For example, it is possible to in-line convert an ethylene/vinyl acetate copolymer synthesized at approximately 6 MI into mildly crosslinked polymers with melt indexes, based on 100 percent polymer, ranging down to well under 1 and probably well under 0.1. The limits of MI reduction are governed by the ability of the mildly crosslinked polymer to flow through the low-pressure separator so it can be extruded, melt cut, and discharged from the continuous process. When the process of this invention is used to mildly crosslink these polymers in-line, the in-line wax addition accomplishes several beneficial results:

1 The wax decreases the level of primary gel in the polymer.

2 The wax greatly dilutes the peroxide (or other free radical source) and improves the ease and speed with which it is blended with the polymer stream. Efficient blending greatly decreases the presence of localized concentrations of free radicals and thereby decreases the formation of secondary gel in the polymer.

3 In addition, the wax decreases the viscosity of the molten polymer and increases the polymer's ability to flow through the process equipment. Without this viscosity reduction, discharge of some low MI crosslinked polymers from the system would be very difficult, if not impossible, at reasonable production rates.

In certain cases, when the primary gel level of the polymer is not high enough to cause problems in the intended end use application and when it is not desirable to add wax to the polymer being crosslinked in the process described above, it is possible to replace the wax as the carrier and diluent for the crosslinking agent (free radical initiator) with other solvents. In these cases the solvent is selected such as to be soluble in the copolymer, not harmful to the crosslinking reaction and not harmful to the ultimate polymer use. Solvents such as dioctyl phthalate and other stable esters, aromatic hydrocarbons such as xylenes, toluene or benzene, mineral spirits, cyclohexane, and even monomeric vinyl acetate can be used. Polymers being crosslinked using non-wax carriers for the crosslinking agent are generally those of higher vinyl acetate content, such as those in the range of 30–50 percent vinyl acetate, rather than those in the range of 5–35 percent vinyl acetate where normally wax would be used as the carrier for the crosslinking agent. In order to obtain copolymers with as high as 50 percent vinyl acetate (or other vinyl ester, acrylate or methacrylate) at least about 75 mol percent of the monomers introduced into the reactor should be ethylene.

The minimum amount of solvent to be introduced is selected such as to be sufficient for the efficient blending of the free radical initiator in the copolymer stream. This decreases localized concentrations of free radicals and thereby avoids excessive formation of secondary gel in the polymer. As low as 1 percent of solvent, based upon the weight of the copolymer, can be employed, and generally about 5 to 20 percent by weight of solvent is preferred. Solvent carried with the gas exiting from the second separator is recovered by well known solvent recovery procedures. Accordingly, the upper limit on the amount of solvent introduced into the copolymer reaction mixture is not critical but is controlled only by routine, practical considerations, such as the extent of solvent recovery one would be willing to undertake, avoidance of undue dilution or cooling of the reaction mixture.

When this process is used to mildly crosslink the polymer flowing through the system, the free radical initiator, or if preferred for safety or convenience reasons, a solution thereof in, e.g., mineral spirits or in one of the other suitable solvents discussed above, is injected at a controlled but variable rate into the wax (or other solvent) stream in line 10. Flow conditions are such that excellent mixing of the free radical initiator and wax streams occurs before the resulting blend contacts the polymer flowing from the first to the second separator. Wax injection rates can be varied so that the final polymer/wax concentrate contains as little as 5 or as much as 50 wt. percent wax. When injecting 10 wt. percent wax into the polymer, the concentration of the free radical initiator in the wax contacting the polymer will usually be in the range of 0.05 to 2.0 wt. percent. This corresponds to 0.005–0.200 wt. percent (or 50 to 2000 parts per million) of free radical initiator, based on the polymer being modified. The concentration of the free radical initiator is selected so as to attain the desired MI in the crosslinked polymer. The specific free radical initiator to be used is determined by the temperature of the polymer stream entering the second separator and by the hold-up time in the second separator. The hold-up time should be at least about five times the half life of the free radical initiator at the given temperature. It is generally desirable to have the half life of the free radical initiator in the range of 10–150 seconds, preferably 30–90 seconds, at this temperature. Temperatures encountered in the second separator while producing the ethylene copolymers covered by this invention are in the range of 100°C. to 200°C., usually 130°–170°C., depending on the MI and comonomer content of the polymer being produced. Free radical initiators suitable for use in this invention cover typical organic peroxide catalysts such as di(2-ethylhexyl) peroxydicarbonate, di(sec.-butyl) peroxydicarbonate, diisopropyl peroxydicarbonate, t-butyl peroxypivalate, 1,1,3,3-tetramethylbutyl peroxy-2-ethyl-hexanoate, 2,5-dimethyl-2,5-bis (2-ethylhexanoylperoxy) hexane, t-butyl peroctoate, t-butyl peroxyisobutyrate, t-butylperoxy isopropyl carbonate, t-butyl peracetate, methyl ethyl ketone peroxides, t-butyl perbenzoate, 2,5-dimethyl-2,5-bis (t-butylperoxy) hexane, di-t-butyl peroxide, 2,5-dimethyl-2,5-bis (t-butylperoxy) hexyne-3, 2,4-pentanedione peroxide. This invention is not limited to peroxide-crosslinking agents but includes other sources of free radicals such as liquid azonitriles (or those soluble in suitable organic solvents) and which have half lives as defined above, "Axo DA-82," manufactured by Lucidol Division of Pennwalt Chemicals, is an example of such an azonitrile.

As in the case of molten wax addition, preferably the free radical initiator/wax (or solvent) stream is injected into the polymer stream between second letdown valve 8 and second separator 9. The free radical initiator/-wax(or solvent) stream can also be introduced between first separator 7 and second letdown valve 8, or into second separator 9, by making the suitable adjustments, e.g., selection of initiator with a longer half-life perhaps combined with maintaining a higher temperature in the second separator 9, providing for additional mixing in second separator 9, etc.

Ethylene/vinyl acetate, ethylene/acrylic ester copolymers and related products which may contain other neutral or acidic comonomers have many uses. They are used commercially as 100 percent polymers or, at 5 to 40 wt. percent concentrations, in blends based on petroleum wax with or without additional components (such as rosin derivatives, pinene, styrene, substituted styrene, and aliphatic olefin-based resins) as coatings on flexible packaging materials, corrugated board, chip board, wood and metal objects. The coatings furnish water resistance and/or heat-sealing properties to the base materials. They are also used, generally at higher concentrations (15–50 wt. percent) in formulations with secondary resins such as mentioned above to form pressure-sensitive or heat seal adhesives. Here applications include labels, bookbinding, industrial adhesives, etc. The improved products of this invention can be used in all of these and many other applications but are particularly useful in coatings applied to clear films where the gel particles become obvious imperfections in the film. They are also desirable when the formulations are applied via curtain coating where the gel particles can contribute to curtain breaks and associated coating imperfections. Gel particles present in the original polymer can promote larger gel particle formation during the preparation of blends, and to the extent this occurs, the improved low gel polymers are desirable in all applications.

In addition to the low gel feature of these polymers their wax content also increases the ease of blend preparation and decreases the blocking tendency of the polymer beads. These features are desirable wherever the blends can be used.

The present invention is further illustrated by the following examples wherein all parts and percentages are by weight, except where noted otherwise.

EXAMPLE 1

Polymer/wax concentrates based on a low melt index (MI) ethylene/vinyl acetate (EVA) copolymer (1.47 MI, 27.1 wt. percent VA) were made containing 5, 10, and 20 wt. percent of a fully refined 146°F. AMP melting paraffin wax ("Essowax 4210" available from Humble Oil and Refining Co., Houston, Texas). This was accomplished by first making a 40 percent polymer/60 percent wax blend by mixing 50 lbs. of wax with 33.3 lbs. of polymer in a steamjacketed baffled vessel stirred with a four-bladed propeller. The blend was made at 150°C., at which temperature it has a viscosity of 25,000 cps. This blend was strand cut to give pellets approximately ⅛ inches in diameter and ⅛–3/16 inches long. Sufficient quantities of these pellets were dry mixed with the 100 percent polymer pellets to give 10 lb. quantities of dry blends containing 5, 10, and 20 wt. percent wax. Each of these dry blends was completely homogenized by passing twice through a 28 mm. Werner Pfleiderer twin-screw extruder. Each blend was extruded at 150°–170°C. under a nitrogen blanket into a single strand which was quenched under water, dried by being blown with compressed air, and cut in a Waldron Hartig strand pelletizer to give clean, cylindrical pellets essentially ⅛ inches × ⅛ inches. In between the first and second pass through the extruder, each blend was thoroughly tumble-mixed. The final products were very uniform in composition from pellet to pellet. For reference purposes a 10 lb. quantity of the 100 percent base polymer was put through the same blending treatment.

Blending time at 150°C. was measured for dissolving 10 wt. percent polymer in a 134°F. AMP fully refined paraffin ("Essowax 3050," available from Humble Oil and Refining Co.). The 90 wt. percent wax content of these blends included both the major 134°F. wax component of the blend and the 146°F. wax that was present in the polymer/wax concentrates. Blending times and viscosity data are given in Table I below.

These 10/90 polymer/wax blends, whether based on the reextruded 100 percent polymer or on the above-described concentrates containing 5, 10, or 20 percent wax, all exhibited a low, but constant level (described as a "trace") of haze. This haze level was not significantly different from the haze level observed in the related 10/90 polymer/"Essowax 3050" blend based on the same 100 percent polymer (Sample 1a, Table III) before it had been reextruded. This haze was caused by the high gel content of the base polymer. The extensive high shear mixing to which these polymer/wax concentrates were subjected in their preparation had no recognizable effect on the gel content of the polymer, as indicated by the appearance of the final 10 wt. percent polymer/90 wt. percent wax blends.

A further measure of the gel content of the base polymer (Sample 1a, Table III) was made using a quantitative test for gel content. In this test 70 g. of polymer is dissolved in 400 g. of a 141°F. AMP melt point refined paraffin wax at 150°C. The combination of solution and subsequent stirring time is held to a standard 3.0-hour period. The wax from which the blend is made is, before use in the test, melted and poured through a 200-mesh stainless steel screen to remove and extraneous solid material from the wax. The polymer/wax blend, after the 3.0-hour blending period, is poured through a 2 inch diameter 100-mesh stainless steel screen (0.0065 inch mesh openings) in an assembly previously heated to 150°C. and maintained at that temperature during the test. The screen is then held flat against filter paper at 150°C. for a 15-minute period to allow the polymer/wax blend to drain from the screen. It is then observed under a 13-power microscope, and the gel particles which have been filtered out of the blend are counted on the screen. According to this test the base polymer (Sample 1a, Table III) employed in this series possessed a gel count of over 400. This very high gel level caused the trace haze which was visible in the blends shown in Table I. The haze (gel) level was not recognizably decreased by high shear working of the polymer in an extruder.

These polymer/wax concentrates were tested for their ability to resist blocking when stored at 50°C. for 24 hours while under a 1 psi load. This was done by placing 150 g. quantities of the concentrates in tall from 16 oz. widemouth glass jars (6 ½ inch × 2 ¼ inch ID), weighting the pellets with a 3.2 lb. weight 2 inches in diameter and placing the test assemblies in an accurately controlled circulating air oven held at 50°C. ± 0.5°C. At the end of the 24-hour heating period, the test assemblies were removed from the oven, allowed to cool to room temperature, and rated for the percent of blocked pellets. The rating was made after putting each jar of pellets through a standard series of five mild manual rotations. The results of this test are given in Table II.

TABLE I

| Sample | 1* | 2 | 3 | 4 |
|---|---|---|---|---|
| Wax content of polymer/wax concentrate, wt. % | 0 | 5 | 10 | 20 |
| Blending Time, Min., to: | | | | |
| 99% in Solution | 25 | 20 | 19 | 14 |
| All in Solution | 30 | 28 | 23 | 16 |
| Blend Viscosity at 121°C. (250°F.), cps. | 96.6 | — | — | 96.6 |
| Blend Appearance Molten at 150°C. | Trace Haze | Trace Haze | Trace Haze | Trace Haze |

*Reextruded 100% polymer control free of wax.

TABLE II

| Sample | 1 | 2 | 3 | 4 |
|---|---|---|---|---|
| % Loose Pellets after 50°C. Block Test | 10 | 80 | 100 | 90 |

Additional physical properties of these concentrates are given in Table III.

TABLE III

| Sample | 1a* | 2 | 3 | 4 |

TABLE III-Continued

| | | | | |
|---|---|---|---|---|
| Melt Index (ASTM Test D-1238, Condition E) | 1.41 | 2.52 | 4.14 | 12.7 |
| Shore Hardness, A-2, 10 Second** | 84 | 90 | 94 | 95 |

*The original polymer prior to reextrusion through the Werner Pfleiderer extruder.

**ASTM Test D-1706

The polymer/wax concentrates of this example exhibit improved rate of solution in wax. They also demonstrate a lessened tendency of pellet to pellet blocking when the pellets are stored in bulk at mildly elevated temperatures such as might be encountered in long-term warehouse storage or in bulk shipment. However, they do not exhibit the desirable characteristics of low gel content which can be obtained by the process of the present invention.

Example 2

Low MI, ethylene/vinyl acetate (EVA) copolymer/wax blends containing 0, 10, and 15 wt. percent of a 149°F. AMP fully refined paraffin wax were produced in plant scale equipment using the high-pressure, free radical-initiated ethylene copolymerization system illustrated in the Figure. Under the conditions of this experimental run, which produced the base polymer at 1,500 parts/hour, approximately 12,120 parts/hour of a recycle stream 3 of ethylene and vinyl acetate monomer was separated from the crude polymer stream in first separator 7. This gas stream left the separator at a pressure of approximately 170 atmospheres and 175°C. It was compressed to 1700 atmospheres, cooled to 25°C., and recycled to polymerization reactor 5. Prior to entering the reactor, it was mixed with fresh ethylene and vinyl acetate stream 2 of approximately 1,860 parts/hour and small recycle stream 12 of approximately 360 parts/hour of mixed ethylene and vinyl acetate. This latter stream was a portion of the gas recovered from the second separator 9. The rest of the gas (approximately 360 parts/hour) recovered from the second separator was, after partial compression in 11, bypassed from the system for purification before reuse. The combined fresh and recylce monomer streams were mixed with initiator stream 4 just at the entrance to the reactor. Approximately 2 parts of the initiator (diisopropyl peroxydicarbonate) were fed to the unit per hour. Reaction took place at 160°C. and 1700 atmosphere pressure. Approximately 11 wt. percent of the monomeric reactants fed to reactor 5 were converted into polymer during their residence in the reactor. The reaction mixture was discharged from the reactor at 1700 atmospheres pressure, and passed through letdown valve 6 into first separator 7 controlled at 170 atmospheres. The unreacted monomers flash vaporized from the crude polymer and were recycled as described above. The crude polymer stream containing some dissolved monomeric ethylene and vinyl acetate passed through second letdown valve 8 and entered second separator 9 at two atmospheres pressure. The overhead gas from 9 (approximately 720 parts/hour) was compressed to about 40 atmospheres pressure and split between recycle and venting as described above. Molten wax 10 of approximately 90°–100°C. was injected into the crude polymer stream between letdown valve 8 and second separator 9. The estimated line pressure at the point of injection was between 10 and 20 atmospheres. The wax used in this program was a 149°F. AMP melt point fully refined paraffin wax ("Pacemaker" 53, available from Cities Service Oil Co., Tulsa, Oklahoma). At a 1,500 parts/hour base polymer production rate the wax added at approximately 167 parts/hour thus resulting in the production of about 1,667 parts/hour of a polymer/wax concentrate containing 10 wt. percent wax.

A concentrate containing 15 wt. percent wax was prepared in similar fashion except for (1) the relatively higher amount of wax added and (2) the reduction of all flow rates to approximately two-thirds of the rate empolyed in the preparation of the 10 percent wax concentrate.

The molten polymer/wax concentrate was discharged from the bottom of second separator 9 into extruder-melt cutter 14. In this unit it was cut under cold water into typical pellet form. The pellets, after dewatering, were transported by air pressure to blending and finishing operations 15.

Physical properties of the polymers obtained in this experimental run are shown in Table IV.

TABLE IV

| Sample | 5 | 6 | 7 |
|---|---|---|---|
| Wax, wt. % | 0 | 10 | 15 |
| MI (ASTM D-1238, Cond. E) | 2.08 | 5.20 | 8.48 |
| VA Content, wt. % | 25.4 | 23.1 | 21.7 |
| Shore Hardness, A-2, 10 Sec. (ASTM D-1706) | 86 | 93 | 94 |

A plot of these properties as a function of wax content corresponds well to the values expected on the basis of blends obtained by the method of Example 1. This clearly demonstrates that uniform polymer/wax blends were produced.

The above polymer/wax concentrates prepared continuously in plant-scale equipment exhibited decreased solution time in wax and decreased blocking tendency at elevated temperatures. These data are given in Table V.

TABLE V

| Sample | 5 | 6 | 7 |
|---|---|---|---|
| Wax, wt. % | 0 | 10 | 15 |
| Blending Time*, Minutes, to: | | | |
| 99% in Solution | 27 | 19 | 16 |
| All in Solution | 35 | 21 | 17 |
| Blocking Test, % Free Pellets** | 10 | 95 | 80 |

*Taking into account the wax present in the polymer/wax concentrates the final blends contained 70 wt. % wax. The wax used in these blends was a 146°F. AMP melt point fully refined paraffin wax.

**The blocking test was run by maintaining the samples, prior to rating, first at 47°C. and then at 51°C. for 48 hours and for 72 hours, respectively.

The quantitative gel content test described in Example 1 was employed to evaluate the three products prepared in this example. The tests on each polymer were run in duplicate and clearly demonstrated that the "in-line" addition of wax to the polymer significantly reduced the gel level of same. The data are shown in Table VI.

TABLE VI

| Sample | 5 | 6 | 7 |
|---|---|---|---|
| Wax, wt. % | 0 | 10 | 15 |
| Gel Count* | 44 | 20 | 6 |
| Gel Count Corrected for Wax Content of the Polymer | 44 | 22 | 7 |

*Average of values obtained on 70 g. of the samples.

EXAMPLE 3

A low MI base polymer containing 25 wt. percent VA and having a MI of approximately 2.0 was produced in the form of a 90/10 polymer/wax concentrate in plant-scale equipment using the process described in Example 2. Production under constant temperature, pressure, and feed conditions was continued for approximately 12 hour to demonstrate the ability of this process to operate continuously and without the buildup of wax in the recycle gas stream. If significant amounts of wax were returned, via the recycle gas stream, to the reactor the telogenic effect of petroleum wax on this polymerization would cause a recognizable increase in the MI of the product. Production rate for the base polymer was about 1,430 parts per hour. Approximately 140 parts/hour of a 149°F. AMP fully refined paraffin wax was added to the polymer "inline" at point 10 as illustrated on the Figure. Production rate for the polymer/wax concentrate was about 1,570 parts/hour Table VII shows that the MI and vinyl acetate (VA) content of samples taken periodically from this production experiment remained constant. This indicates that there was no MI drift and therefore no harmful amounts of wax entered the reactor. This clearly demonstrates the ability of the present process to operate continuously producing low gel content polymer/wax concentrate of constant composition.

TABLE VII

| Hours of Production at Time of Sampling | MI | VA, Wt. % |
|---|---|---|
| | (2.0)* | (25.0)* |
| 0.3 | 4.33 | 23.7 |
| 0.8 | 6.26 | 22.8 |
| 1.3 | 5.84 | 22.7 |
| 1.8 | 6.40 | 22.9 |
| 2.3 | 7.03 | 22.6 |
| 3.3 | 6.90 | 23.2 |
| 4.3 | 6.44 | 22.4 |
| 5.3 | 5.86 | 21.5 |
| 6.3 | 5.99 | 21.5 |
| 7.3 | 6.05 | 21.7 |
| 8.3 | 7.43 | 22.6 |
| 9.3 | 6.74 | 23.2 |
| 10.3 | 6.47 | 22.5 |
| 11.3 | 5.50 | 22.6 |
| Average Values | 6.21 | 22.5 |

*Base resin levels before start of wax addition.

EXAMPLE 4

Low MI EVA copolymer/wax blends containing 0 and 12 wt. percent of a 149°F. AMP fully refined paraffin wax, employing a 30 wt. percent VA base polymer, were produced in plant-scale equipment following the general procedure described in Example 2. Production rate of the base polymer was approximately 870 parts/hour and that of the polymer/wax concentrate approximately 990 parts/hour. Physical properties and gel contents of these polymers are given in Table VIII.

TABLE VIII

| Sample No. | 8 | 9 |
|---|---|---|
| Wax Concentration, wt. % | 0 | 12 |
| MI (ASTM D-1238. Cond. E) | 6.0 | 20.3 |
| VA, wt. % | 30.4 | 26.0 |
| Shore Hardness, A-2, 10 Second* | 78 | 90 |
| Gel Count (When corrected for the wax content of the polymer) | 23 | 4 |

*ASTM D-1706

Again the "in-line" addition of the petroleum wax to the polymer significantly reduced the gel content of the polymer.

EXAMPLE 5

Ethylene/vinyl acetate polymers at the 25 wt. percent base level, but higher in MI than those described in Examples 2 and 3, containing 0 and 8 wt. percent of a 149°F. AMP fully refined paraffin wax were produced in plant-scale equipment following the general procedure described in Example 2. Production rate of the base polymer was 1,830 parts/hour and that of the polymer/wax concentrate, 1,980 parts/hour. Physical properties and gel contents of the two polymers are given in Table IX.

TABLE IX

| Sample No. | 10 | 11 |
|---|---|---|
| Wax Concentration, wt. % | 0 | 8 |
| MI (ASTM D-1238, Cond. E) | 18.2 | 42.4 |
| VA, wt. % | 25.3 | — |
| Shore Hardness, A-2, 10 Sec.* | 80 | 87 |
| Gel Count (When corrected for the wax content of the polymer) | 49 | 12 |

*ASTM D-1706

The gel content of the polymer/wax concentrate is markedly reduced from that of the base polymer. This is another example of "in-line" wax addition reducing the gel level of the concentrate from that of the wax free base polymer.

EXAMPLE 6

1. Production of Polyethylene/Wax Concentrates Via In-Line Injection of Paraffin Wax into the Process During Polyethylene Manufacture The experimental program was carried out in a highly instrumented, but smalll-scale, continuous pilot plant which has been used in the past to study the effect of polymerization conditions on gel content of ethylene homopolymer. Correlation has been established between the small-scale equipment and commerical low-density polyethylene facilities.

Polymerization grade ethylene at 2500 psi is blended with a suitable telogen (cyclohexane in this case) for product melt index control and then is compressed to 27,000 psi in a 30,000 psi rated diaphragm pump. The ethylene after compression flows through ⅛ inch ID, ⅜ inch OD high-pressure tubing into the reactor. Peroxide initiator is injected into the ethylene approximately 12 inches before the stream enters the reactor. The initiator is injected via a double acting 30,000 psi rated diaphragm pump. Rate of initiator injection is automatically controlled to maintain the desired polymerization temperature in the reactor. Initiator consumption per 1000 lbs. of polymer produced in this unit correlates 1 to 1 with initiator consumption in the commercial plant. The reactor is an internally baffled and agitated pressure vessel rated for operation in excess of 30,000 psi. Agitation is constant at 1500 rpm. The reactor is electrically heated with heat input adjusted so that ethylene conversion matches the conversion obtained in the commerical plant. The reaction mixture flows from the reactor through the tails line (⅛ inch ID high-pressure tubing) and is blended with molten wax injected at 27,000 psi via a double-acting 30,000 psi rated diaphragm pump. The length of ⅛ inch ID line from the reactor to wax injection is about 6 feet. The injection point selected from the various points taught by Schrader U.S. Pat. No. 3,030,322 was picked as the spot most likely to show the beneficial effect (reduction) of in-line wax injection on polymer gel content, if such effect indeed exists, because it is as near as possible to the reactor and the actual polymerization. Pressure control of the system is via a high-pressure needle control valve 6 feet downstream from the point of wax injection. Pressure control is accurate to less than 100 psi out of 27,000 psi. The reaction mixture discharges through the control valve and then passes through a sintered stainless steel plate which serves to blend the product and essentially corresponds to the extrusion zone in the Schrader patent. The rapid expansion of unreacted ethylene beyond the high-pressure needle control valve and the sintered stainless steel plate serves to spray disperse and cool the polymer so that it is collected in the form of a coarse powder. The unreacted ethylene is vented for recovery or disposal.

The wax used was "Pacemaker" 53, a fully refined 149°F. AMP paraffin obtained from Cities Service Oil Company. This was the same wax used in the full plant scale example of injecting wax in-line during the continuous production of ethylene/vinyl acetate copolymers (Example 2). The polymerization unit was brought to steady state production of 1.5 –2.0 melt index (MI; ASTM D-1238) polyethylene and then run for three consecutive hours on this product. Three one-hour samples were collected, and they all were very close in MI and conversion. Wax injection was then immediately started and three successive 1-hour samples of the polymer/wax concentrate were collected. Again MI and conversion for the three hours were constant. Data averaged from these six hours of operation are summarized in Table X below.

TABLE X

|  | A. Control No Wax | B. With Wax Injection |
|---|---|---|
| Reactor Temperature, °C. | 225 | 224 |
| Reactor Pressure, psig | 27,000 | 27,000 |
| Ethylene Feed, lb./hr. | 28 | 28 |
| Wax Injection Pressure, psig | — | 27,000 |
| Polymer Produced, lb./hr. | 2.652 | — |
| Polymer/Wax Concentrate, lb./hr. | — | 3.305 |
| Wax Added (by Difference), lb./hr. | — | 0.653 |
| Wax in the Concentrate, wt. % | — | 19.8 |
| MI of Product* | 1.74 | 13.7 |
| Product Color** | White | White |

*g./10. min. (ASTM D-1238)
**Product isolated as a coarse powder, roughly 30-60 mesh.

2. Gel Content of the Polyethylene and Polyethylene/Wax Concentrate Produced

Determination of gel content was run essentially as described in Example 1. Seventy grams of polymer were dissolved in 400 g. for a 141°F. AMP fully refined paraffin wax at 150°C. The combination of solution and subsequent stirring time was held to a standard 3.0-hour period. The wax from which the blend was made was, before use in the test, melted and poured through a 200-mesh stainless steel screen to remove any extraneous solid material from the wax. The polymer/wax blend, after the 3.0-hour stirring period, was poured through a 2.5 inch diameter 100-mesh stainless steel screen (0.0065 inch mesh openings) in an assembly previously heated to 125°C. After essentially all of the solution had run through the screen, the assembly was allowed to drain for another 15 minutes in a 125°C. oven. The screen was then removed from the assembly, pressed, and held flat on several layers of filter paper and stored at 125°C. for 15 minutes of further draining. The top side of the screen, which contained the gel particles removed from the wax solution, was carefully protected from contamination and/or disturbance during the draining period. After this draining period the screen was allowed to cool to room temperature. The screens were then observed under a 13-power binocular microscope, and the number of gel particles trapped on the screen were counted. The screens were illuminated from above, but at a low angle, to assist in recognition and counting of the particles.

This test was applied to duplicate 70 g. samples of the polyethylene and to duplicate 87.5 g. samples of the polyethylene/wax concentrates. These are the two materials referred to as "A" and "B", respectively, in Table X. The B samples were taken at 87.5 g. to compensate for the 20 percent wax they contained. An equivalent reduction from 400 to 382.5 g. of added wax was used in preparing the B sample solutions in this gel study. The data are given below in Table XI.

TABLE XI

|  | Gel Count/70 g. Polymer | |
|---|---|---|
|  | A. (Control, No Wax) | B. (With Wax Injection) |
| Test 1 | 60 | 80 |
| Test 2 | 48 | 82 |

The data indicate that, if anything, the polymer sample (B) containing the in-line added wax had somewhat more gel than the non-wax control. Certainly the data show that wax was not beneficial in reducing the gel level from that of the non-wax control (A). This is in contradistinction to the results obtained when in-line wax injection was applied to the ethylene/vinyl acetate copolymers of Examples 2 to 5.

In addition the gel level of the polymers was evaluated by the following qualitative method. Samples from each of three one-hour productions without wax and from each of the three one-hour productions with wax injection were blown into 1.5 mil thick film with a lay-flat film width of 4 ¾ inches. This was done at 170°C. using a Brabender ¾ inch diameter, 25 L/D extruder feeding a ¾ inch circular die set at a 20 mil gap. Extrusion rate was 22 g. of polymer, or polymer/wax concentrate, per minute. Visual rating of the six film samples indicated similar gel contents in both the A and B series but with slightly more, rather than less, gel in the polymer/wax concentrate than in the no-wax control. These observations agreed with the quantitative gel counts described above indicating that in-line wax injection proved ineffective in lessening gel in polyethylene and in this respect, differs markedly from the effect of in-line wax injection during the production of ethylene/vinyl acetate copolymers.

EXAMPLE 7

An experiment (Run I) was carried out by charging a 1300 ml. stainless steel rocker bomb with 160 grams of vinyl acetate and 0.40 gram of tertiary-butyl peroxide. The bomb was sealed, pressured with ethylene and heated at 135°C., 300 atmospheres pressure, for 3 hours. The bomb was then cooled and vented. The polymer was removed from the rocker bomb and was dried under vacuum at 55°–60°C. The ethylene/vinyl acetate (E/VA) copolymer has a vinyl acetate content of 37.8 percent by weight and a melt index of 328 grams/10 min., which corresponds to an inherent viscosity of about 0.56 (0.25 percent concentration by weight in toluene at 30°C.).

A further experiment (Run II) was carried out by charging a 1300 ml. stainless steel rocker bomb with 160 grams of vinyl acetate and 0.40 gram of tertiary-butyl peroxide. The bomb was sealed, pressured with ethylene and heated at 135°C., 300 atmospheres pressure, for 3 hours. Then, while maintaining the bomb at 135°C. at 300 atmospheres, 15 ml. of molten paraffin wax ("Pacemarker" 53, City Service Oil Company, 149°F. AMP melt point) were injected. After the wax addition, the bomb was agitated for 30 minutes at reaction temperature and pressure. The bomb was cooled and vented and the polymerwax blend was removed from the rocker bomb and was dried under vacuum at 55°–60°C. The E/VA copolymer-wax blend had a wax content of 8.0 percent by weight, a vinyl acetate content of 34.8 percent by weight (corresponding to 37.8 percent by weight vinyl acetate content of the E/VA copolymer) and a melt index of 396 grams/10 min.

The E/VA copolymer of Run I and the E/VA copolymer-wax blend of Run II were then analyzed for gel content following the procedure of the quantitative test described in Example 1. The results are given below.

|  | Run I | Run II |
|---|---|---|
| Wax Content (% by weight) | 0 | 8 |
| Gel Count* | 170 | 210 |

*Gel particles/70 g. polymer.

These results show a high gel content for both experimental products and also show that wax addition by the process of Moss U.S. Pat. No. 3,048,553 was not beneficial in reducing polymer gel level. In fact, wax addition was mildly harmful in this respect, i.e., it resulted in increased gel level.

EXAMPLE 8

The use of very low peroxide concentrations in wax for blending into molten polymer and mildly crosslinking it, without developing undesirable gel levels, was demonstrated in a series of laboratory-scale experiments. In this program the various steps of the continuous process were isolated and run individually. These steps are described below.

a. Solutions of low concentrations of tertiary butyl peracetate (half-life of about 60 seconds at 160°C.) in molten paraffin wax were prepared at 63°C. (145°F.) where the half-life of the peroxide is well over 1,000 hours. The wax was "Pacemaker" 37, a 135°–137°F. melting fully refined paraffin obtained from Cities Service Oil Company. Concentrations of the peroxide in the wax were 0, 225, 450, 900, 2250, 4500, and 9000 parts per million (ppm).

b. Samples of 5.4 MI, 28 wt. percent VA containing E/VA copolymer, weighing 2724 g., in the usual form of spheroidal pellets about ⅛ to 3/16 inch in diameter, were stored overnight in an oven held at 61°C. during which time they came to equilibrium with the oven temperature but remained as individual, essentially free-flowing pellets. The molten peroxide/wax solutions (303 g. each) were poured over the warm beads and manually stirred at approximately 60°C. for 10–15 minutes, during which time the wax/peroxide solutions were absorbed into the beads. The beads then were poured out in shallow containers and cooled to room temperature where they retained their individual bead form but contained 10 percent wax + peroxide, although not uniformly blended throughout each bead. The peroxide contents of the treated polymer samples were 0, 25, 50, 250, 500, and 1000 ppm based on the polymer present.

c. The polymer/wax/peroxide samples were then passed once through a 28 mm. Werner-Pfleiderer twin-screw extruder at 125°–130°C. to uniformly blend the wax and peroxide throughout the polymer, without destroying any significant portion of the peroxide (the half-life of the peroxide at 130°C. is 21 minutes, and the holdup time for the polymer in the extruder was 0.8 minutes). The blended polymer exiting from the extruder as a single strand was chilled and cut into ⅛ inch × ⅛ inch cylinders as described in Example 1.

d. The extrusion-blended samples containing 10 percent wax and essentially all of the originally added peroxide were then passed through the extruder (under a nitrogen blanket) at 190°–200°C. to decompose the peroxide and promote peroxide-initiated crosslinking of the polymer (peroxide half-life of 4 seconds at 190°C.). Physical property data on these crosslinked polymer/wax concentrates are given in Table XII below.

TABLE XII

| Sample No. | Peroxide Treatment Level, ppm | MI of Polymer/ Wax Blends after 190°C. Extrusion[1] | Viscosity of Polymer/Wax Blends[2] in 1000 cps. units at 149°C. |
|---|---|---|---|
| 12 | 0 | 7.73 | 26.5 |
| 13 | 25 | 4.68 | 48.3 |
| 14 | 50 | 2.90 | 69.4 |
| 15 | 100 | 2.70 | 74.6 |
| 16 | 250 | 1.15[3] | 188 |
| 17 | 500 | 0.54[4] | 517 |
| 18 | 1000 | 0.26[5] | 1150 |

[1] g./10 min. (ASTM 1238). Each sample was dusted with 0.2 wt. % antioxidant (2,6-ditertiary butyl-4-methyl phenol) to prevent MI drift during MI measurement.

[2] 45% Polymer
  5% "Pacemaker" 37 (in the polymer/wax concentrate)
  50% "Pacemaker" 53
  0.1% antioxidant, 2,6-ditertiary butyl-4-methyl phenol

[3] corresponds in wax thickening power to a mildly crosslinked copolymer (not containing wax) having a melt index of 0.1

[4] corresponds in wax thickening power to a mildly crosslinked copolymer (not containing wax) having a melt index of about 0.03–0.04

[5] corresponds in wax thickening power to a mildly crosslinked copolymer (not containing wax) having a melt index of about 0.01–0.02.

These data indicate that a low level of peroxide can be used to crosslink an E/VA copolymer to such an extent that it has many times its original ability to thicken paraffin wax.

The peroxide-treated polymers were still low in gel content when crosslinked sufficiently to possess more wax/thickening ability than attained with low gel polymers made by direct synthesis. This is illustrated in the data given in Table XIII.

TABLE XIII

| Polymer Sample | Viscosity of Polymer/Wax Blend*, cps. at 149°C. | Blend Appearance at 149°C. |
| --- | --- | --- |
| 12 | 195 | Clear |
| 1 | 433 | Trace Haze |
| 16 | 501 | Clear |
| 18 | 1303 | Trace Haze |

*15% polymer 85 percent 142°F. melting fully refined paraffin Sample 1 is the low MI, 27 percent VA polymer discussed in Example 1. It was made by direct synthesis in full-scale continuous equipment. As discussed in Example 1, this polymer had a gel content of over 400/70 g. of polymer, and its gel content was not recognizably altered by blending and extrusion with 5, 10, or 20 wt. percent paraffin wax. However, as shown by the data in Table XIIX, a low gel (clear blend) polymer can be crosslinked with peroxide to give a polymer (Sample 16) which has greater ability to thicken wax, and is still low in gel content (clear blend), than does Sample 1. This indicates a marked advantage for the process of the present invention over that of direct synthesis of low MI polymers. The peroxide-initiated crosslinking process of this invention allows production of low MI polymers with relatively low gel content, while polymers with similar thickening power made by direct synthesis are relatively high in gel content.

EXAMPLE 9

In the continuous process for the production of mildly crosslinked polymers of low gel content the peroxide decomposition and polymer crosslinking occur in the presence of about 1 to 3 wt. percent of dissolved, but unreacted, monomeric vinyl acetate. The presence of this monomeric vinyl acetate has no significant effect on the crosslinking reaction. This was demonstrated by a series of experiments in which two 6,000 g. batches of polymer/wax were prepared, one containing no peroxide and the other containing 333 ppm of tertiary butyl peracetate. Three 1500 g. samples of each batch were placed in clean unlined 1-gallon paint cans equipped with tightfitting lids. One of these samples from each batch was held as control, the second was treated with 1.0 wt. percent monomeric vinyl acetate, and the third treated with 3.0 wt. percent of monomeric vinyl acetate. This treatment was accomplished by sprinkling the liquid monomer over the polymer/wax beads, closing the cans, and storing them for 18–20 hours with frequent shaking to allow the vinyl acetate monomer to approach equilibrium throughout the samples.

After this storage period each sample was subjected to the 190°–200°C. extrusion as described in Example 8. The vinyl acetate-treated samples smelled strongly of vinyl acetate after the extrusion. They were purged with air at 45°C. for 16 hours to remove the vinyl acetate monomer and their MI values measured:

TABLE XIV

| Sample No. | Peroxide Treatment, ppm | Monomeric VA Added, Wt. % | MI* |
| --- | --- | --- | --- |
| 19 | 0 | 0.0 | 10.6 |
| 20 | 0 | 1.0 | 9.3 |
| 21 | 0 | 3.0 | 9.4 |
| 22 | 333 | 0.0 | 0.78 |
| 23 | 333 | 1.0 | 0.81 |
| 24 | 333 | 3.0 | 0.82 |

*g./10 min. (ASTM 1238). Each sample was dusted with 0.2 wt.% antioxidant (2,6-ditertiary butyl-4-methyl phenol) to prevent MI drift during MI measurement.

The data show that the monomeric vinyl acetate level (0, 1, or 3 wt. percent) had no significant effect on the ability of the peroxide to crosslink the polymer. The 0.8 MI possessed by the samples containing 333 ppm peroxide fits very well into the MI vs. peroxide level data given in Table XII. None of the other physical property measurements made on these polymers or their blends showed any effect of monomeric vinyl acetate on the polymer crosslinking reaction.

EXAMPLE 10

The free radical (e.g., peroxide) initiated crosslinking process of this invention was demonstrated in plant-scale equipment using the high-pressure, free radical initiated ethylene continuous copolymerization system described in Example 2, but modified to permit the injection of a suitable peroxide into the wax stream before the wax stream mixed with the crude polymer stream. Conditions were very similar to those described in Example 2 (based on a reactor temperature of 160°C.) except that the vinyl acetate content of the feed stream was increased sufficiently to produce a copolymer containing 28 wt. percent VA, and the initiator for the polymerization reaction was disecondary butyl peroxydicarbonate rather than diisopropyl peroxydicarbonate. The wax used in this program was "Pacemaker" 53, and injection was at a rate of 167 parts/hour which, at the base polymer production rate of 1,500 parts/hour, resulted in the production of 1,667 parts/hour of a polymer/wax concentrate containing 10 wt. percent wax.

After establishing a base line for the polymer without wax (sample 25), four different experiments were completed while wax was being added to the crude polymer stream. The first of these experiments served as a control with no added peroxide (sample 26). The remaining three experiments served to demonstrate the effect three levels of peroxide addition had on the MI of the produced polymer/wax concentrate (samples 27, 28 and 29). The peroxide in this series of tests was t-butyl peroctoate (half-life of approximately 60 seconds at 140°C.). A solution of it in mineral spirits was pumped into the wax stream in line 10 where it was well mixed with the wax before the resulting peroxide/wax solution was injected into the crude polymer stream between letdown valve 8 and second separator 9. Peroxide feed rates were at 145, 380, and 660 parts per million based on the polymer treated.

Physical properties of the polymers obtained in this series of experiments are shown in Table XV. These data illustrate the reduction in gel count achieved by the in-line injection of wax into the polymer (compare sample 25 gel count with that of sample 26). They also illustrate the reduction in MI achieved by the in-line crosslinking of the base copolymer with low concentrations of peroxide. While the MI of the polymer/wax concentrate was reduced from 9.14 to 4.88 to 2.60 to 1.52 by the peroxide treatment, wax-insoluble gel content of the polymer remained very low. It is noteworthy that sample 28 essentially matched the wax-thickening power of sample 1 (the direct synthesis low MI polymer of Example 1), and sample 29 thickened wax considerably more than sample 1. Both samples 28 and 29 were very low in wax-insoluble gel content, while sample 1 possessed a very high gel level.

TABLE XV

| Sample | 25 | 26 | 27 | 28 | 29 | 1 |
|---|---|---|---|---|---|---|
| Vinyl acetate content, wt. % | 28.3 | 25.4 | 25.6 | 25.7 | 25.5 | 27.1 |
| Wax, wt. % | 0 | 10 | 10 | 10 | 10 | 0 |
| Peroxide treatment, ppm | 0 | 0 | 145 | 380 | 660 | 0 |
| MI[1] | 4.0 | 9.14 | 4.88 | 2.60 | 1.52 | 1.47 |
| Gel Count[2] | 22 | 12 | 11 | 3 | 5 | 400 |
| Blend viscosity at 149°C., in units of 1000 cps[3] | — | 20.3 | 34.7 | 50.4 | 72.5 | 52.1 |

[1]g/10 min (ASTM 1238), each sample contained 0.05–0.10 wt. % antioxidant (2,6-ditertiary butyl-4-methyl phenol) which prevented MI drift during MI measurement
[2]Based upon 70 g. of polymer (corrected for wax content of the sample)
[3]Blend contains 45 wt. % polymer and 55 wt. % "Pacemaker" 53 paraffin wax

We claim:

1. In a continuous, high-pressure, free radical polymerization process for preparing ethylene copolymers having reduced gel content comprising
   a. introducing ethylene and at least one monomer selected from the group consisting of vinyl esters of $C_1$ to $C_4$ monobasic aliphatic acids, acrylates and methacrylates wherein the alcohol moiety is derived from aliphatic $C_1$ to $C_4$ monohydroxy alcohols, acrylic acid, methacrylic acid, maleic acid, and maleic anhydride, provided that at least 85 mol percent of the monomers is ethylene and sufficient amount of said vinyl ester, acrylate or methacrylate monomer is introduced to yield at least about 5 weight percent of units derived from said monomer in the resulting copolymer, and an initiator into the reactor,
   b. maintaining said monomers and initiator in contact in said reactor at a temperature of about 100°C.–250°C. and a pressure of about 1,000–2,500 atmospheres until the desired extent of conversion to ethylene copolymers has been obtained,
   c. removing the reaction mixture from said reactor,
   d. reducing the pressure by first pressure let-down means such that the reaction mixture enters a first separator at about 100–400 atmospheres,
   e. separating out from said reaction mixture in said first separator about 90–97 percent of the unreacted monomers,
   f. further reducing the pressure by second pressure let-down means such that the reaction mixture enters a second separator at about 0–5 atmospheres, and
   g. separating out from said reaction mixture in said second separator substantially all of the remaining about 3–10 percent by weight of unreacted monomers,
the improvement in said process comprising the in-line addition of about 5–50 percent by weight based on the total weight of the copolymer and wax, of molten petroleum, polyethylene or Fischer-Tropsch wax to said ethylene copolymer reaction mixture after the pressure has been reduced to below about 250 atmospheres and after at least about 90 percent by weight, but not more than about 97 percent by weight, of the unreacted monomers have been separated out from said reaction mixture.

2. The process of claim 1 wherein a sufficient amount of said vinyl ester, acrylate or methacrylate monomer is introduced to yield at least about 15 weight percent of units derived from said monomer in the resulting copolymer.

3. The process of claim 1 wherein the ethylene copolymer is selected from the group consisting of ester, ethylene/acrylate and ethylenemethacrylate copolymers.

4. The process of claim 3 wherein the copolymer also contains about 0.01–10 percent by weight of units derived from at least one monomer selected from the group consisting of acrylic acid, methacrylic acid, maleic acid and maleic anhydride.

5. The process of claim 1 wherein the wax is a petroleum wax.

6. The process of claim 5 wherein the ethylene copolymer has a melt index of about 0.1 to 100.

7. The process of claim 6 wherein the ethylene copolymer is selected from the group consisting of acetate, ethylene/isobutyl acrylate, ethylene/vinyl acetate/methacrylic acid, and ethylene/isobutyl acid.

8. The process of claim 5 wherein in step (b) the temperature is about 120°C.–210°C. and the pressure is about 1300 atmospheres to 2000 atmospheres, in step (d) the pressure is reduced such that the reaction mixture enters said first separator at about 150–200 atmospheres, and in step (f) the pressure is reduced such that the reaction mixture enters said second separator at about 1–3 atmospheres.

9. The process of claim 8 wherein the molten wax is added to the ethylene copolymer reaction mixture after the pressure has been reduced to between about 10 and 50 atmospheres.

10. The process of claim 8 wherein the molten wax is added to the ethylene copolymer reaction mixture after at least 95 percent by weight of the unreacted monomers have been separated out from said reaction mixture.

11. The process of claim 7 wherein the molten wax is added in-line after the reaction mixture left said first separator but before leaving said second separator.

12. The process of claim 11 wherein the molten wax is added in-line between said second pressure let-down means and said second separator.

13. The process of claim 12 wherein the molten wax is added to the ethylene copolymer reaction mixture at at least two different locations.

14. The process of claim 8 wherein the molten wax is selected from the group consisting of refined paraffin waxes having AMP melting points between about 130°F. 160°F., refined, intermediate or microcrystalline waxes having ASTM D-127 melting points of about 140°F.–200°F.

15. The process of claim 14 wherein about 5–20 percent by weight of molten wax is added to the ethylene copolymer reaction mixture.

16. The process of claim 1 wherein, with said molten wax, a free radical initiator is added in-line to said ethylene copolymer reaction mixture, thereby producing an at least about 50 percent reduction in the melt index of said ethylene copolymer.

17. The process of claim 16 wherein said ethylene copolymer has a melt index of about 0.01 to 50.

18. The process of claim 17 wherein said ethylene copolymer has a melt index of about 0.05 to 5.

19. The process of claim 17 wherein the ethylene copolymer is selected from the group consisting of ethylene/vinyl ester, ethylene/acrylate, and copolymers.

20. The process of claim 19 wherein the copolymer also contains about 0.01–10 percent by weight of units derived from at least one monomer selected from the group consisting of acrylic acid, methacrylic acid, maleic acid and maleic anhydride.

21. The process of claim 19 wherein the ethylene copolymer is selected from the group consisting of acetate, ethylene/isobutyl acrylate, ethylene/vinyl acetate/methacrylic acid, and ethylene/isobutyl acid.

22. The process of claim 16 wherein the free radical initiator has a half life of about 10 to 150 seconds at the temperature of the reaction mixture in the second separator.

23. The process of claim 22 wherein the free radical initiator is selected from the group consisting of organic peroxides and azo compounds.

24. The process of claim 22 wherein the free radical initiator is selected from the group consisting of t-butyl peroctoate, t-butyl peroxyisobutyrate, t-butyl peracetate, t-butyl perbenzoate, 2,5-dimethyl-2,5-bis (t-butylperoxy) hexane, 2,5-dimethyl-2,5-bis(t-butylperoxy) hexyne-3.

25. The process of claim 21 wherein the hold-up time in the second separator is at least about five times the half-life of the free radical initiator at the temperature of the reaction mixture in the second separator.

* * * * *

UNITED STATES PATENT OFFICE
CERTIFICATE OF CORRECTION

PATENT NO. : 3,884,857
DATED : May 20, 1975
INVENTOR(S) : Edward Cooper Ballard and John Ricks Priest It is certified that error appears in the above-identified patent and that said Letters Patent are hereby corrected as shown below:

| Patent Column | Line | Corrections |
|---|---|---|
| 6 | 8 | "150 inch" should be -- 1/8" -- |
| 6 | 32 | after "reaction" insert -- mixture -- |
| 8 | 33 | "Axo DA-82" should be -- Azo DA-82 -- |
| 9 | 28 | "has" should be -- had -- |
| 10 | 47 | "from" should be -- form -- |
| 11 | 44 | "recylce" should be -- recycle -- |
| 12 | 4 | after "wax" insert -- was -- |
| 12 | 12 | "empolyed" should be -- employed -- |
| 13 | 9 | "hour" should be -- hours -- |
| 14 | 37 | "smalll" should be -- small -- |
| 17 | 3 | "has" should be -- had -- |
| 22 | 9 | after "consisting of" insert -- ethylene/vinyl -- |
| 22 | 35 | after "consisting of" insert -- ethylene/vinyl -- |
| 22 | 37 | after "ethylene/isobutyl" insert -- acrylate/methacrylic -- |
| 23 | 17 | after "and" insert -- ethylene methacrylate -- |
| 24 | 2 | after "consisting of" insert -- ethylene/vinyl -- |
| 24 | 4 | after "ethylene/isobutyl" insert -- acrylate/methacrylic -- |

Signed and Sealed this thirtieth Day of September 1975

[SEAL]

Attest:

RUTH C. MASON
*Attesting Officer*

C. MARSHALL DANN
*Commissioner of Patents and Trademarks*